United States Patent [19]

Suchowerskyj et al.

[11] 4,243,971
[45] Jan. 6, 1981

[54] TEST CIRCUIT FOR AUTOMOTIVE PASSENGER RESTRAINT SYSTEMS

[75] Inventors: Wadym Suchowerskyj; Berthold Seibel, both of Schwieberdingen; Peter Werner, Wiernsheim, all of Fed. Rep. of Germany

[73] Assignee: Robert Bosch GmbH, Stuttgart, Fed. Rep. of Germany

[21] Appl. No.: 82,572

[22] Filed: Oct. 9, 1979

[30] Foreign Application Priority Data

Nov. 28, 1978 [DE] Fed. Rep. of Germany ....... 2851333

[51] Int. Cl.³ .............................................. G08B 21/00
[52] U.S. Cl. ................................ 340/52 H; 340/516
[58] Field of Search ................. 340/52 R, 52 E, 52 H, 340/61, 514, 516, 573, 667

[56] References Cited
U.S. PATENT DOCUMENTS

| | | | |
|---|---|---|---|
| 3,601,655 | 8/1971 | Andersen | 340/516 |
| 3,818,431 | 6/1974 | Hosaka | 340/52 H |
| 3,863,208 | 1/1975 | Balban | 340/52 H |
| 3,931,527 | 1/1976 | Oishi et al. | 340/52 H |

*Primary Examiner*—Alvin H. Waring
*Attorney, Agent, or Firm*—Frishauf, Holtz, Goodman & Woodward

[57] ABSTRACT

In order to provide for complete testing of all the components of a trigger circuit for actuating an automotive passenger restraint system, and thereby to prevent unintentional deployment of restraint systems, for example air bags, the test circuit performs a testing program which is initiated at the moment when electric power is applied to the passenger safety system. The testing program checks the operation of the electronic discriminator circuits as well as the correct operation of the power output circuit by generating a simulated triggering signal. The actuation of the passenger restraint system is prevented during the test cycle by blocking an auxiliary semiconductor switch connected in series with the power output transistor of the triggering circuit.

10 Claims, 2 Drawing Figures

TEST CIRCUIT FOR AUTOMOTIVE PASSENGER RESTRAINT SYSTEMS

FIELD OF THE INVENTION

The invention relates to electrically actuated passenger restraint systems for automobiles. More particularly, the invention relates to an electronic test circuit for insuring the operability and correct functioning of the restraint system upon each application of the electrical power thereto. The test circuit includes means for preventing an unintentional actuation of the passenger restraint system during the testing cycle.

BACKGROUND OF THE INVENTION AND PRIOR ART

In a known test circuit for testing the correct functioning of a passenger restraint system, described in the U.S. Pat. No. 3,911,391, the output stage of the system which normally actuates the restraint system is blocked during the test program. Accordingly, it is impossible to detect any possible defect in the output stage. In some passenger restraint systems, for example the so-called air bag restraints, in which a collision of the vehicle with an obstacle results in the automatic inflation of an air bag to protect the occupants, an intentional release can be as dangerous as a failure to deploy. Accordingly, the entire system including the output stage should be checked at regular intervals.

OBJECT AND SUMMARY OF THE INVENTION

It is thus a principal object of the present invention to provide a test circuit for a passenger restraint system which tests the correct functioning not only of all electronics serving to detect and process the actuation signals occurring in a collision, but also to test the correct functioning of the power output stage of the circuit, in particular of the power output transistor whose conduction causes a current to flow through the firing element or fuse of the safety or restraint system. This object is attained according to the invention by providing a testing circuit which places an auxiliary semiconductor switch in series with the power output transistor of the restraint system. The test circuit according to the invention prevents a simultaneous conduction of the two semiconductor switches.

In a favorable feature of the invention, the test program has a first testing interval in which the power output transistor of the restraint system as well as the auxiliary semiconductor switch are both blocked and the voltage occurring therebetween is used as a control signal. This connection provides additional assurance against unintentional release of the system when the operating power is applied because, if the power output semiconductor were to become conductive due to an erroneous actuation signal or for some other reason, it would not result in a deployment of the passenger restraint system. Another advantageous feature of the invention is to use the voltage occurring between the two semiconductor switches as input for two different threshold circuits which permits testing the semiconductor elements as well as the magnitude of the applied voltage.

Still further features and advantages of the invention will emerge from the following detailed description of a preferred exemplary embodiment which relates to the drawing.

THE DRAWING

FIG. 1 is a schematic circuit diagram of a testing circuit according to the invention; and FIG. 2 is a timing diagram illustrating the magnitude of various signals at different parts of the circuit as a function of time.

DESCRIPTION OF THE PREFERRED EMBODIMENT

Figure 1:
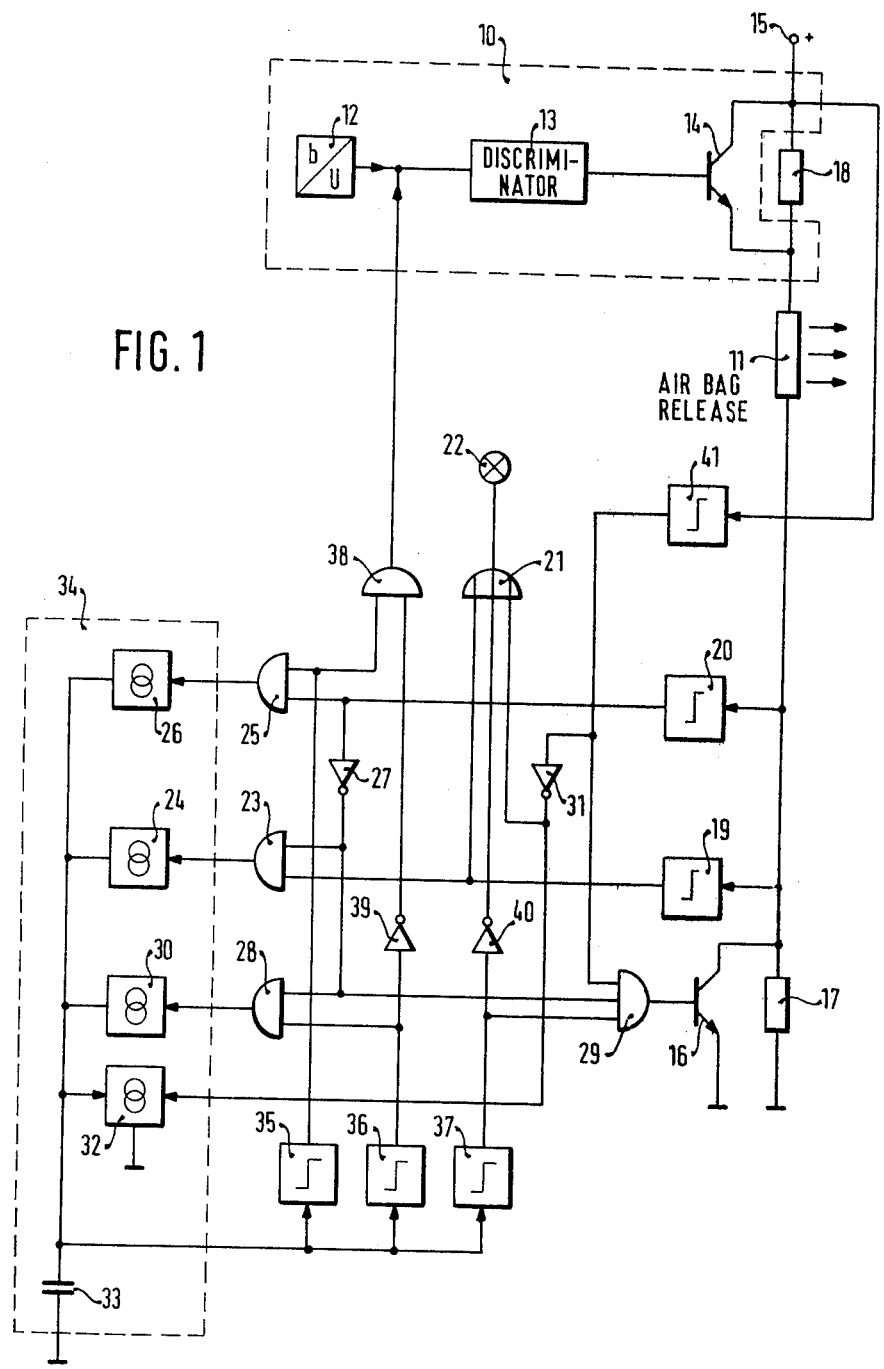

In the embodiment illustrated in FIG. 1, a passenger restraint system or other passenger safety system 11, for example an air bag deployment device 11, is actuated by a known release mechanism 10 which is activated by a signal from an acceleration detector 12. The acceleration signal from the detector 12 may be proportional to acceleration or it may be a signal which occurs when the acceleration experienced by the vehicle exceeds a given limit. The acceleration signal is fed to a discriminator and processor circuit 13 of known construction which tests the received signal to determine if it is due to an accident, i.e., the collision of the vehicle with some obstacle, or if it was produced spuriously by other accelerations of the vehicle, for example those occurring due to heavy braking or passage of the vehicle over very irregular road surfaces. If the discriminator 13 determines that a collision has occurred, it produces an output signal which is applied to the base of the power output transistor 14, causing it to conduct current from the positive pole of a power supply, not shown, received on a contact 15. The current conducted by the transistor 14 may pass, for example, through an incandescent wire which ignites a chemical explosive compound which generates gases that abruptly expand an air bag. An actuating system 10 to which the invention may be applied is described, for example, in the aforementioned U.S. Pat. No. 3,911,391.

The actuating element of the passenger restraint or safety device 11 is connected to ground or the negative pole of the power supply via the parallel connection of a transistor 16 and a resistor 17. A further resistor 18 is connected in parallel with the power output transistor 14. The resistance values of the resistors 17, 18 are very high by comparison to the resistance of the actuating element 11 of the passenger restraint system. Accordingly, any current capable of passing through the series connection of the safety device actuator 11 and one of the resistors 17, 18 is insufficient to fire the safety device actuator 11.

The junction of the safety device actuator and the resistor 17 is connected to the inputs of two threshold circuits 19, 20. The output of the threshold circuit 19 is connected to one input of an OR gate 21 which can energize a warning or control lamp 22, possibly through an amplifier, not shown. The output of the threshold circuit 19 is further connected to one input of an AND gate 23 whose output constitutes the input of a first current source 24. The output of the threshold circuit 20 is connected through an AND gate 25 to the input of a second current source 26 and via an inverter 27 to a further input of the AND gate 23 as well as to one input of another AND gate 28. It is still further connected to one input of an AND gate 29. The output of the AND gate 28 feeds the input of a third current source 30. The output of the AND gate 29 is connected to the base of the transistor 16. Power from the contact 15 is applied to a threshold switch 41. The output of the threshold switch 41 is connected to a further input of the AND gate 29 and, via an inverter 31, to a further input of the OR gate 21 as well as to the control input of a current sink 32. The outputs of the current sources 24, 26, 30 and the current input of the current sink 32 are jointly connected to one side of a capacitor 33, the other side of which is grounded. The current sources and sinks 24, 26, 30, 32, together with the capacitor 33, constitute a current integrator 34 having three discrete constants of integration. The integrator 34 and the three subsequent threshold circuits 35–37 constitute a system of timing elements. The output of the threshold circuit 35 is connected to a further input of the AND gate 25 as well as through an AND gate 38 to the input of the detector and discriminator circuit 13 of the trigger circuit 10. The output of the threshold circuit 36 is applied to a further input of the AND gate 28 and also via an inverter 39 to a further input of the AND gate 38. Finally, the output of the threshold switch 37 is connected to a further input of the AND gate 29 and, via an inverter 40, to a further input of the OR gate 20.

Figure 2:
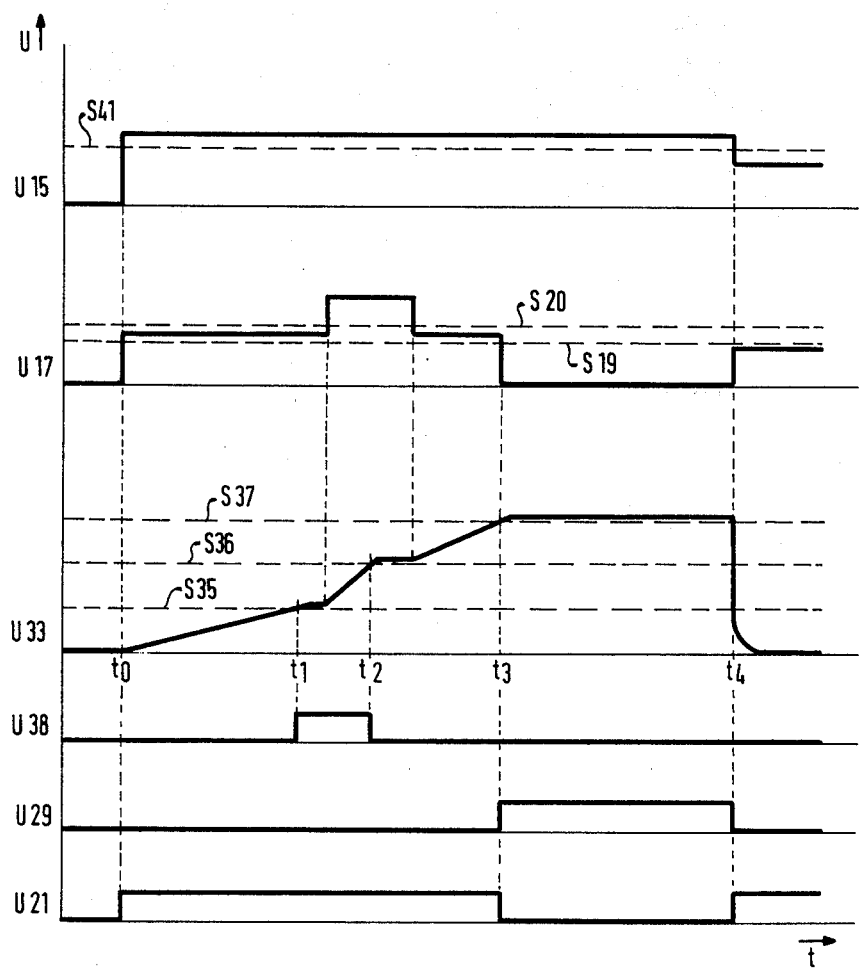

The operation and function of the circuit illustrated in FIG. 1 will now be explained with the aid of the timing diagram of FIG. 2. In the timing diagram of FIG. 2, the voltages shown as ordinates are either output voltages of circuit elements identified by the reference numeral or are voltages carried by circuit elements having the same reference numeral.

If power of potential U15 is applied to the contact 15 at the time $t_0$, both conductors 14, 16 are initially blocked. Accordingly, the inputs of the two threshold circuits 19 and 20 receive a voltage which is determined by the ratio of resistances of the resistors 17, 18 and the magnitude of the supply voltage. Inasmuch as the resistance of the safety device actuator 11 is relatively low, it has no practical effect on the voltage applied to the threshold switches 19 and 20. If the resistances 17, and 18 are chosen to be, for example, equal, the voltage applied to the threshold circuits 19, 20 will be one-half the supply voltage. In that case, it is suitable to adjust the threshold of the circuit 19 to a value S19 slightly below one-half of the supply voltage and to adjust the threshold S20 of the threshold circuit 20 to a value lying somewhat above one-half of the supply voltage. If both transistors 14, 16 are operative and function correctly, they will both be blocked and in that case, only the threshold switch 19 will respond to the applied voltage. Due to the presence of the inverter 27, both inputs of the AND gate 24 receive, for example, logical 1 signals, which energize the current source 24. The current flowing from the current source 24 charges the capacitor 33 until the voltage thereon has reached the value S35 at the time $t_1$. This time must be so chosen, either by adjusting the current flowing from the source 24 or by adjusting the threshold S35, that any spurious signals which may occur due to the application of the supply voltage have definitely decayed. In the known triggering device 10 it would be possible, for example, for such spurious signals to cause an accidental deployment of the passenger restraint system under certain circumstances. The current source 24 includes a current-limiting mechanism which prevents charging the capacitor 33 to a voltage exceeding a value just above S35. Accordingly, the voltage on the capacitor 33 cannot reach the levels S36 or S37 without actuation of the current sources 26 or 30.

The voltage applied at the contact 15 is also checked for the correct magnitude by a threshold switch 41. If the supply voltage U15 lies below the minimum permissible value S41, the threshold switch 41 does not respond and holds the AND gate 29 in a continuously blocked condition while the inverter 31 turns on the current sink 32 which prevents any charging of the capacitor 33. The presence of the threshold circuit 41 provides additional safety, causing blockage of the transistor 16 even when the supply voltage U15 collapses at a later time, thus preventing unintentional release of the safety device due to supply voltage reductions.

The response of the threshold circuit 35 initiates the second programmed testing phase by causing the AND gate 38 to generate a simulated trigger signal at the input of the discriminator circuit 13. If this circuit 13 functions correctly and if the output power transistor 14 also functions correctly, the trigger signal will cause the transistor 14 to become conducting after the passage of a certain amount of time. When the transistor 14 conducts, the voltage at the input of the threshold circuits 19, 20 rises to substantially the full supply voltage. In this process, the threshold S20 is crossed so that both threshold circuits 19, 20 generate the same output signal, for example, a logical 1. Accordingly, the current source 24 is shut off and the current source 26 is turned on. The capacitor 33 continues to be charged by current flowing from the current source 26 until the voltage across the capacitor 33 reaches the level S36 at the time $t_2$. This occurrence terminates the second programmed testing phase and the simulated trigger signal U38 is shut off by the changing output of the inverter 39 which blocks the gate 38. The current source 26 also contains a current limiter which limits the charge on the capacitor 33 to a value such that the voltage cannot exceed the value S36 by more than a given amount. If the output transistor 14 functions correctly, it will return into its non-conducting state after the passage of a short amount of time so that the voltage U17 drops to one-half the supply voltage causing the threshold circuit 20 to switch over to a logical 0 output signal which shuts off the current source 26 and turns on the current source 30 via the inverter 27 and the AND gate 28. Current flowing from the current source 30 now charges the capacitor 33 still higher until the voltage thereon crosses the threshold S37. The changing output signal of the threshold circuit 37 causes the AND gate 29 to render the transistor 16 conducting and it remains conducting until the supply voltage is removed or falls below the threshold S41 as illustrated in the diagram of FIG. 2 at the time $t_4$. The time $t_3$ constitutes the termination of the testing program and the release mechanism of the safety device is operational thereafter.

At the initiation of the testing cycle, i.e., when power is first applied to the circuit, the logical 0 at the output of the threshold circuit 37 causes the signal light 22 to be energized. The signal light 22 is deenergized at the end of the testing program, i.e., when the threshold circuit 37 responds and the signal U20 ends. However, if the supply voltage is lower than the nominal value U41 and half the supply voltage lies below the value S19, the light 22 continues to be energized, signaling a defect to the driver. The light will also remain on if the test program cannot be terminated. If the entire system functions correctly, the signal lamp 22 will light very briefly and uniform the driver of the correct operation.

If a number of passenger safety devices are disposed in a single vehicle, the circuit according to the invention may be provided in multiple units or several safety devices 11 can be connected in parallel and tested together. It is also possible to test a plurality of safety devices, each actuated independently by separate power output circuits 14, by connection to the collector of the transistor 16 for common testing.

The testing circuit according to the invention may also be embodied as a purely digital circuit. For such an embodiment, the current sources 24, 26, 30 may be replaced, for example, by counters which receive signal trains of different frequency under the control of the AND gates 23, 25, 28 and the inverter 31. The place of the threshold circuits 35–37 would then be taken by decoding circuits which respond to particular counter contents or by digital comparators. The function of the circuit described above may also be performed advantageously by a microprocessor.

The duration of the simulated trigger signal U38 is of critical importance for testing the correct functioning of the discriminator circuit 13. In particular, the duration of the signal U38 could be so chosen as to just permit the discriminator circuit 13 to respond to a signal of that duration if it functions correctly. The duration of the signal U38 may be precisely determined by a monostable multi-vibrator connected behind the AND gate 38. If the discriminator 13 is defective with respect to recognizing the correct length of the simulated trigger signal, the application of the output signal of the discriminator 13 to the transistor 14 may be prevented. This action interrupts the testing cycle and causes the signal light 22 to remain lit up.

The foregoing description relates to a preferred exemplary embodiment of the invention which is subject to variations and modifications within the spirit and scope of the invention.

Current sources / sink 24,26,30,32 might be e.g. the IC: CA 3080 (RCA).

We claim:

1. A test circuit for automotive passenger safety systems, said safety system including a trigger signal discriminator and a power output stage actuated by said discriminator, said power output stage serving to actuate said safety system, and wherein, according to the invention, said test circuit comprises a semiconductor switch (16) which may be placed in electrical series connection with said power output stage (14) and said safety system (11), said test circuit including means for preventing simultaneous conduction of said switch (16) and said power output stage (14) during a test.

2. A test circuit according to claim 1, further comprising a threshold circuit (20) the input of which is connected to a point lying between said semiconductor switch (16) and said power output stage (14) for generating an output signal when a simulated trigger signal has actuated said power output stage (14) during a test.

3. A test circuit according to claim 1, further comprising a resistor (18) in parallel with said power output stage (14) and a resistor (17) in parallel with said semiconductor switch (16), the resistance value of said resistors (17, 18) being high when compared to the resistance of said safety system (11) and still further comprising two threshold switches (19,20), the inputs of which receive the voltage prevailing between said power output stage and said semiconductor switch (16), the triggering threshold of said switch (19) lying slightly above a reference value and the triggering threshold of said switch (20) lying slightly below said reference value, said reference value being the voltage which occurs at the inputs of said switches (19,20) when said power output stage (14) and said semiconductor switch (16) are both in the non-conducting state and when the potential of the power supplied to the circuit is nominal.

4. A test circuit according to claim 3, further comprising timing means (34-37) for timing sequential steps of a test program, the sequence of steps being controlled by logical gate circuits and taking place only if a previous step proved to be nominal.

5. A test circuit according to claim 4 wherein, in a first testing step, both said power output stage (14) and said semiconductor switch (16) are blocked and only said threshold switch (19) responds for nominal conditions of said system.

6. A test circuit according to claim 5, wherein, in a further testing step, a trigger signal is generated, causing triggering of both threshold switches (19,20) for nominal test conditions.

7. A test circuit according to claim 6, wherein, in a further testing step which begins at the end of a trigger signal, nominal test conditions are indicated by response of only said threshold switch (19).

8. A test circuit according to claim 5, wherein, in a further testing step, said semiconductor switch (16) is rendered conducting, and nominal test conditions are indicated by triggering of one of said threshold switches (19,20).

9. A testing circuit according to claim 8, wherein said last named testing step is the final testing step.

10. A testing circuit according to claim 1, comprising a signaling device (22) and means for energizing said signaling device (22) during the first testing step and de-energizing said signaling device (22) during the last testing step.

* * * * *